(12) United States Patent
Stearns

(10) Patent No.: US 7,691,480 B1
(45) Date of Patent: *Apr. 6, 2010

(54) ELASTOMERIC URETHANE COMPOSITION

(75) Inventor: Robert B. Stearns, Luna Pier, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,062

(22) Filed: Jul. 8, 2005

(51) Int. Cl.
*B32B 27/40* (2006.01)
*C08G 18/22* (2006.01)
*C08G 18/48* (2006.01)

(52) U.S. Cl. .................... 428/423.3; 521/123; 521/124; 521/174; 528/55; 528/66; 528/76; 528/77

(58) Field of Classification Search .................... 528/52, 528/66, 55, 76, 77; 521/123, 124, 174, 176; 525/453, 123; 425/517, 543; 428/423.3
See application file for complete search history.

(56) References Cited

U.S. PATENT DOCUMENTS

| 2,893,063 | A | * | 7/1959 | Hoppe ........................ 264/45.3 |
| 3,664,976 | A | * | 5/1972 | Evans et al. ............... 428/318.8 |
| 3,824,199 | A | * | 7/1974 | Nadeau et al. ................. 521/51 |
| 5,846,897 | A | | 12/1998 | Blank et al. |
| 5,965,686 | A | | 10/1999 | Blank et al. |
| 6,590,057 | B1 | * | 7/2003 | Brecht et al. ................... 528/52 |
| 2002/0041954 | A1 | * | 4/2002 | Henrichs et al. ......... 428/316.6 |

FOREIGN PATENT DOCUMENTS

WO    WO 98/14587    *    7/1994

OTHER PUBLICATIONS

*Troubleshooting Metal Catalyzed Urethane Systems*, by John Florio / Group Leader, Coatings Technical Service, King Industries, Norwalk, CT; http://www.pcimag.com/CDA/ArticleInformation/features/BNP__Features__Item/0,1846,11371,00.html; Jun. 29, 2005; pp. 1-10.
*Catalysis of the isocyanate-hydroxyl reaction by non-tin catalysts*; by Werner J. Blank, Z.A. He, E.T. Hessell; Progress in Organic Coatings 35 (1999) pp. 19-29.
*Catalysis of the Isocyanate-Hidroxyl Reaction By Non-Tin Catalysts In Water Borne Two Component Polyurethane Coations*; UDC 66.097.3; by Jakov Stamenkovic, Suzanna Cakie, Sandra Konstantinovic, Sonja Stoilkovic; Facta Universitatis, Series: Working and Living Environmental Protection, vol. 2, Nov. 4, 2004, pp. 243-250.
K-KAT® Non-Tin Catalysts for Polyurethanes; Product Catalog, King Industries Specialty Chemicals; Copyrighted 2004, King Industries, Inc., Norwalk, CT, USA, pp. 11-13.
BASF Corporation US Patent Application title Elastomeric Urethane Composition, Jul. 2005.

* cited by examiner

*Primary Examiner*—Milton I Cano
*Assistant Examiner*—Benjamin J Gillespie
(74) *Attorney, Agent, or Firm*—Howard & Howard Attorneys PLLC

(57) ABSTRACT

An elastomeric urethane composition that is the reaction product of an isocyanate and resin comprising polyetherol in the presence of a catalyst. The catalyst includes a metal selected from the group of titanium, zirconium, and hafnium. The elastomeric urethane is used in a method of making an article, which comprises reacting the isocyanate with the resin in the presence of the catalyst to form the elastomeric urethane, applying the elastomeric urethane to a mold cavity, and allowing it to cure to form a first layer. The method also includes applying a different urethane composition to the mold to form a second layer. The method further includes curing the article in the mold and de-molding the article.

30 Claims, No Drawings

ELASTOMERIC URETHANE COMPOSITION

FIELD OF THE INVENTION

The present invention generally relates to an elastomeric urethane composition used to form a polyurethane elastomer. The invention also relates to a method of forming an article that is formed from the elastomeric urethane composition. More specifically, the present invention relates to an elastomeric urethane composition that includes the reaction product of a resin composition and an isocyanate, in the presence of a catalyst.

DESCRIPTION OF THE RELATED ART

Various elastomeric urethane compositions have been investigated for use in industrial processes to form polyurethane elastomers. Polyurethane elastomers are non-foamed and can be used in a wide variety of applications including in both automotive and non-automotive supplies. Polyurethane elastomers include the reaction product of a polyol and an isocyanate reactive with the polyol. In the past, unsuccessful efforts have been made to reduce production costs associated with formation of the polyurethane elastomers. The production costs include money spent on raw materials, costs for controlling an amount of water in the raw materials and humidity of the production area to ensure an efficient cure of the polyurethane elastomer, and time expended on inefficient reactions of the polyol and the isocyanate.

As is well known in the art, the reaction of the polyol and the isocyanate typically proceeds slowly, thereby decreasing a cost effectiveness of the reaction. As a result, many catalysts have been used to increase a rate of the reaction. The catalysts include organotin compounds, zinc carboxylates, bismuth carboxylates, and organomercury compounds. Although effective, these catalysts are highly toxic and require expensive disposal, further contributing to production costs.

Many of these catalysts not only increase the rate of the reaction of polyol and the isocyanate, but also catalyze a reaction of the isocyanate and any water and humidity present in the reaction vessels, which is undesirable. Water and humidity, if present, are known to react with the isocyanate to form gaseous carbon dioxide. The formation of gaseous carbon dioxide leads to formation of voids and blisters in the polyurethane elastomer which decrease structural integrity and density of the polyurethane elastomer. As such, production costs associated with forming the polyurethane elastomers are also high due to the need for removing water from the raw materials and humidity from the production area.

Many of these catalysts also deactivate when exposed to water and humidity. As a result, any water in the raw materials or humidity in the production area, not only reacts with the isocyanate, but also deactivates the catalyst and prevents any further use of the catalyst. This potential deactivation of the catalyst requires more catalyst to be used in the reaction vessels. Consequently, use of more catalyst increases production costs.

Efforts have been made to simultaneously reduce water and humidity present in the reaction vessels and to reduce production costs. One effort includes the addition of particulates such as moisture scavengers, molecular sieves, and fumed silica to the polyol and the isocyanate to absorb any water and humidity present. However, addition of particulates to the polyol and/or the isocyanate, although useful for absorbing water and humidity and for decreasing formation of the gaseous carbon dioxide, is expensive and increases production costs.

Addition of particulates may also weaken structural stability and decreases roller fatigue resistance of the polyurethane elastomer. Particulates may also disrupt a uniformity of the volume, mass, and density of the elastomeric urethane compositions, resulting in inconsistencies in homogeneity, texture, and durability of the polyurethane elastomers. Inconsistencies in homogeneity and texture may prevent use of the elastomeric urethane composition in production facilities that employ spraying and/or pouring techniques to form the polyurethane elastomer and articles formed therefrom. Inconsistencies in the durability may cause the elastomeric urethane composition to break down when subjected to environmental stresses such as changes in temperature and pressure, thereby decreasing marketability and usability.

Another effort is disclosed in U.S. Pat. No. 5,965,686 to Blank et al. The '686 patent discloses use of a catalyst that includes zirconium or hafnium. The '686 patent also discloses that the catalyst effectively catalyzes the reaction of the polyol and the isocyanate while not effectively catalyzing the reaction of water and the isocyanate. Although the '686 patent discloses useful advances in catalyst technology, the '686 patent does not disclose a reduction of particulates present in the polyol and/or isocyanate as a way to reduce production costs or to improve durability, roller fatigue resistance, usefulness and marketability of the polyurethane elastomer. As such, there remains an opportunity to improve durability, roller fatigue resistance, and usefulness of the polyurethane elastomer by reducing particulates and minimizing production costs to produce a marketable product.

SUMMARY OF THE INVENTION AND ADVANTAGES

The present invention provides an elastomeric urethane composition substantially free of particulates such as molecular sieves and fumed silica. The elastomeric urethane composition includes the reaction product of a resin composition and an isocyanate. The resin composition also includes a polyetherol. The polyetherol includes an ethylene oxide cap of from 5 to 20% by weight based on the total weight of the polyetherol. The polyetherol has a number average molecular weight of from 1,500 to 10,000 g/mol, a hydroxyl number of from 20 to 100 mg KOH/g, and a nominal functionality of from 2 to 4. The resin composition and the isocyanate are reacted in the presence of a catalyst including a metal selected from the group of titanium, zirconium and hafnium. The resin composition and the isocyanate react in the presence of the catalyst preferably to form a polyurethane elastomer.

The present invention also provides an elastomeric urethane system substantially free of particulates. The elastomeric urethane system includes the resin composition, the isocyanate, and the catalyst described above.

The present invention further provides a method of making an article in a mold having a mold cavity. The method includes reacting the resin composition and the isocyanate in the presence of the catalyst to form the elastomeric urethane composition. The method also includes applying the elastomeric urethane composition, described above, to the mold cavity, and allowing the elastomeric urethane composition to cure to form a first layer. The method also includes applying a urethane composition, different from the elastomeric urethane composition described above, to the mold cavity to form a second layer. The method further includes curing the article in the mold cavity and demolding the article from the mold cavity.

Particulates, which are not as widely produced as polyetherols and isocyanates, are known to be more expensive than polyetherols and isocyanates. The present invention does not require spending money on the particulates which decreases overall production costs of producing the polyurethane elastomer. The resin composition and the elastomeric urethane composition is homogeneous. The homogeneity of the resin composition and the elastomeric urethane composition allows the polyurethane elastomer to have an excellent roller fatigue resistance (i.e., an increased resiliency) when subjected to roller fatigue testing. The roller fatigue resistance of the polyurethane elastomer increases marketability of the polyurethane elastomer. The homogeneity of the resin composition and the elastomeric urethane composition also allows the resin composition and the elastomeric urethane composition to be used by a customer with great ease and with a reduced chance that settling will occur within the resin composition that would require mixing. Ease of use of the elastomeric urethane composition increases marketability.

The catalyst, including the metal selected from the group of titanium, zirconium and hafnium, has a high catalytic efficiency for the reaction of the polyetherol and the isocyanate. The high catalytic efficiency increases the rate of the reaction. As a result, the elastomeric urethane composition can be sprayed while minimizing dripping that accompanies spraying the polyetherol and isocyanate, when these components are not reacted or when these components are reacting slowly. When dripping is minimized, the elastomeric urethane composition is used more efficiently, thereby further reducing production costs. An increased rate of reaction also allows the polyurethane elastomer formed from the elastomeric urethane composition to be de-molded in a short period of time further reducing production costs associated with time spent waiting for de-molding.

The catalyst also has decreased sensitivity to water and humidity present in the reaction vessel and is, therefore, not deactivated when exposed to water and humidity. The water in the reaction vessel does not have to be removed. Also, less catalyst is required for use in the reaction and costs, therefore, are reduced.

The catalyst also does not effectively catalyze the undesired side reaction of water and humidity with the isocyanate that forms gaseous carbon dioxide. As such, the polyurethane elastomer has structural integrity and sufficient density. The catalyst also does not include highly toxic metals such as tin and mercury. As a result, the catalyst does not require costly disposal, still further decreasing potential production costs.

DETAILED DESCRIPTION OF A PREFERRED EMBODIMENT

An elastomeric urethane composition, according to the present invention, is substantially free of particulates and includes the reaction product of a resin composition, including a polyetherol, and an isocyanate. The resin composition and the isocyanate react in the presence of a catalyst preferably to form a polyurethane elastomer. Without intending to be limited by any particular theory, it is believed that the primary reaction occurs between the polyetherol, which is a component of the resin composition, and the isocyanate. The resin composition, the polyetherol, the isocyanate, and the catalyst are described in greater detail below.

The polyurethane elastomer of the present invention is not foamed. Any foaming that occurs is not desired, is preferably minimized and is most preferably eliminated. The polyurethane elastomer is preferably used to form articles including non-automotive parts such as those used in farming, outdoor sport, and marine applications. The polyurethane elastomer may also be used in industrial applications as coatings, foams, adhesives, sealants, and in reaction injection molded plastics. In a preferred embodiment of the present invention, the polyurethane elastomer is used to form a first layer of a seat body for a farming application. The preferred embodiment of the present invention will also be described in greater detail below.

The particulates that are minimized and preferably eliminated in the elastomeric polyurethane composition typically include, but are not limited to, solids, inert inorganic fillers, reactive inorganic fillers, fumed silica, molecular sieves, chopped glass, glass mat, and combinations thereof. More typically, the particulates include reactive and inert inorganic fillers fumed silica, and molecular sieves. Most typically, the particulates include fumed silica and molecular sieves. It is to be understood that substantially free, as related to the present invention, preferably includes an amount of particulates in the elastomeric urethane composition of less than 1, more preferably of less than 0.50, and most preferably of less than 0.05, parts by weight of the particulates per 100 parts by weight of the resin composition.

Without intending to be bound or limited by any particular theory, it is believed that presence of the particulates disrupts a uniformity of the volume, mass, and density of the elastomeric urethane composition resulting in inconsistencies in homogeneity, texture, and durability of any polyurethane elastomers or articles produced using the elastomeric urethane composition. As such, it is believed that if the particulates are minimized or eliminated from the elastomeric urethane composition, the elastomeric urethane composition will have a uniform homogeneity, texture, and durability and will provide great ease in customer use. It is also believed that if the particulates are minimized or eliminated from the resin composition, the resin composition will have a reduced chance of settling that would require mixing. Consistent homogeneity of the elastomeric urethane composition that is substantially free of the particulates also allows the elastomeric urethane composition to be used by a customer with great ease, increasing marketability.

Referring now to the polyetherol first introduced above, the polyetherol preferably includes the reaction product of an initiator and an alkylene oxide. Preferably, the initiator is selected from the group of aliphatic initiators, aromatic initiators, and combinations thereof. More preferably, the initiator is selected from the group of ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, and combinations thereof. Most preferably, the initiator is selected from the group of glycerol, 1,1,1-trimethylolpropane, and combinations thereof. However, it is contemplated that any suitable initiator known in the art may be used in the present invention.

Preferably, the alkylene oxide that reacts with the initiator to form the polyetherol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide. However, it is also contemplated that any suitable alkylene oxide that is known in the art may be used in the present invention.

The polyetherol also includes an ethylene oxide cap of from 5 to 20% by weight based on the total weight of the polyetherol. The polyetherol preferably includes an ethylene oxide cap of from 10 to 20, more preferably of from 12 to 20, and most preferably of from 12 to 18, percent by weight based on the total weight of the polyetherol. It is to be understood that the terminology "cap" refers to a terminal portion of the polyetherol. Without intending to be bound by any particular theory, it is believed that the ethylene oxide cap promotes an increase in a rate of the reaction of the polyetherol and the isocyanate. As such, the ethylene oxide cap of the polyetherol allows the elastomeric urethane composition to be effectively used in impingement mixing and spraying techniques to form the polyurethane elastomer and articles formed therefrom, without dripping, contributing to a reduction of production costs. An increased rate of reaction also allows the polyurethane elastomer formed from the elastomeric urethane composition to be de-molded in a short period of time further reducing production costs.

The polyetherol also has a number average molecular weight of from 1,500 to 10,000 g/mol. More preferably, the polyetherol has a number average molecular weight of from 3,000 to 8,000, and most preferably of from 4,800 to 6,500, g/mol. Without limiting the scope of the present invention, it is believed that the number average molecular weight of the polyetherol contributes to the flexibility of the polyurethane elastomer. An increase in flexibility is believed to contribute to an increase in durability and roller fatigue resistance of the polyurethane elastomer.

The polyetherol also has a hydroxyl number of from 20 to 100 mg KOH/g. More preferably, the polyetherol has a hydroxyl number of from 20 to 50, and most preferably of from 24 to 36, mg KOH/g. The polyetherol also has a nominal functionality of from 2 to 4. Most preferably, the polyetherol has a nominal functionality of 3. Further, the polyetherol may be present in the resin composition in any amount depending on the hydroxyl number of the polyetherol and if a filler or plasticizer is included in the elastomeric urethane composition. However, the polyetherol is preferably present in the resin composition in an amount of from 60 to 70 and most preferably of from 65 to 67, parts by weight per 100 parts by weight of the resin composition. Still further, the polyetherol may also include an organic functional group selected from the group of a carboxyl group, an amine group, a carbamate group, an amide group, and an epoxy group. A most preferred polyetherol for use in the present invention includes a polyetherol commercially available from BASF Corp. of Wyandotte, Mich., under the trade name of Pluracol® 380.

The elastomeric urethane composition may also include a second polyetherol. It is contemplated that the second polyetherol may be present in the resin composition or may be independent from the resin composition. The second polyetherol, if included, is different from the polyetherol present in the resin composition. If the second polyetherol is included, the second polyetherol is preferably formed from a reaction of a second initiator and a second alkylene oxide. The second initiator is preferably selected from the group of aliphatic initiators, aromatic initiators, and combinations thereof. More preferably, the second initiator is selected from the group of ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, and combinations thereof. Most preferably, the second initiator includes ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, and combinations thereof.

The second polyetherol also preferably has a number average molecular weight of from 1,500 to 10,000 g/mol. More preferably, the second polyetherol has a number average molecular weight of from 3,000 to 8,000, and most preferably of from 4,000 to 6,000, g/mol.

The second polyetherol also preferably has a hydroxyl number of from 20 to 100 mg KOH/g. More preferably, the second polyetherol has a hydroxyl number of from 20 to 50, and most preferably of from 24 to 36, mg KOH/g. The second polyetherol also preferably has a nominal functionality of from 1.6 to 4. Most preferably, the second polyetherol has a nominal functionality of 2. Further, the second polyetherol is preferably present in the resin composition in an amount of from 1 to 50 and most preferably of from 5 to 20, parts by weight per 100 parts by weight of the resin composition. Still further, the second polyetherol may also include an organic functional group selected from the group of a carboxyl group, an amine group, a carbamate group, an amide group, and an epoxy group. A most preferred second polyetherol for use in the present invention includes a second polyetherol commercially available from BASF Corporation of Wyandotte, Mich., under the trade name of Pluracol® 1062.

Referring now to the isocyanate first introduced above, the isocyanate preferably includes an aromatic isocyanate, an aliphatic isocyanate, and/or combinations thereof. Most preferably, the isocyanate includes an aromatic isocyanate. If the isocyanate includes an aromatic isocyanate, the aromatic isocyanate preferably corresponds to the formula R'(NCO) wherein R' is a polyvalent organic radical which is aromatic and z is an integer that corresponds to the valence of R'. Preferably, z is at least two. The isocyanate of the present invention is preferably aromatic because the aromaticity imparts increased reactivity towards the reaction of the isocyanate with the polyol, and a reduced cost associated with manufacture of the isocyanate.

The isocyanate may include, but is not limited to, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. A preferred example of a 4,4'-diphenylmethane diisocyanate is commercially available from BASF Corporation of Wyandotte, Mich., under the trade name of Lupranate® MM103.

If the isocyanate includes an aromatic isocyanate, the isocyanate may also include a modified multivalent aromatic isocyanate, i.e., a product which is obtained through chemical reactions of aromatic diisocyanates and/or aromatic polyisocyanates. Examples include polyisocyanates including, but not limited to, ureas, burets, allophanates, carbodiimides, uretonimines, and isocyanurate and/or urethane groups including diisocyanates and/or polyisocyanates such as modified diphenylmethane diisocyanates. The isocyanate may also include, but is not limited to, modified benzene and toluene diisocyanates, employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. Most preferably, in the present invention, the isocyanate is selected from the group of 2,4'-diphenylmethane diisocyanate, 4,4'-diphenylmethane diisocyanate, modified 2,4'-diphenylmethane diisocyanate, modified 4,4'-diphenylmethane diisocyanate, and combinations thereof. The isocyanate may also include stoichiometric or non-stoichiometric reaction products of the aforementioned isocyanates. A preferred example of a modified diphenylmethane diisocyanate is commercially available from BASF Corporation of Wyandotte, Mich., under the trade name of Lupranate® MP102. However, it is contemplated that in all embodiments of the present invention, any isocyanate known in the art may be used in the present invention.

The isocyanate preferably has a % NCO content of from 8 to 34, more preferably of from 10 to 30, and most preferably of from 23 to 30, percent by weight. Determination of the % NCO content on percent by weight is accomplished by a standard chemical titration analysis known to those skilled in the art. Also, the isocyanate preferably has a nominal functionality of from 1.7 to 3, more preferably of from 1.9 to 3, and most preferably of from 1.9 to 2.1. Further, the isocyanate preferably has a number average molecular weight of from 125 to 525, more preferably of from 140 to 420, and most preferably of from 183 to 420, g/mol. Still further, the isocyanate preferably has a viscosity of from 15 to 2000, more preferably of from 50 to 1000, and most preferably of from 50 to 700, cps at 25° C.

As first introduced above, the polyetherol preferably reacts, in the presence of the catalyst, with the isocyanate, to form the polyurethane elastomer. Preferably, the polyetherol and the isocyanate are reacted at an isocyanate index of from 90 to 110, more preferably of from 98 to 105, and most preferably of from 100 to 103. The isocyanate index for the present invention is defined as a ratio of the number of isocyanate (NCO) groups in the isocyanate to the number of hydroxyl (OH) groups in the polyetherol.

Referring now to the catalyst first introduced above, the catalyst includes a metal selected from the group of titanium, zirconium and hafnium. Preferably, the catalyst increases the rate of the reaction of the polyetherol and the isocyanate to form the polyurethane elastomer. Preferably, the catalyst includes the general structure:

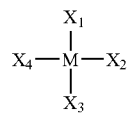

wherein M is selected from the group of titanium, zirconium and hafnium and wherein each of $X_1$, $X_2$, $X_3$, and $X_4$ are ligands. More preferably, M is selected from the group of titanium and zirconium. Most preferably, M includes zirconium. In all embodiments of the present invention, any titanium, zirconium, and/or hafnium present in the catalyst form titanium chelates, zirconium chelates, and hafnium chelates, respectively. Preferably, each of the ligands $X_1$, $X_2$, $X_3$, and $X_4$, which may be the same or may be different, are independently selected from the group of a diketone having the general structure $R^1COCH_2COR^2$ (Structure I) and an alkylacetoacetate having the general structure $R^1OCOCH_2COR^2$ (Structure II). Each of $R^1$ and $R^2$ preferably include one of a branched or linear hydrocarbon and preferably include of from 1 to 20 carbon atoms. However, hydrocarbons having greater than 20 carbons atoms are also contemplated for use in the present invention. Preferably, each of the ligands $X_1$, $X_2$, $X_3$, and $X_4$ are 2,4-pentanedionate or 6-methyl-2,4-heptanedionate. More preferably, at least one of the ligands $X_1$, $X_2$, $X_3$, and $X_4$ independently includes 2,4-pentanedionate.

Other examples of suitable ligands that may be used in the present invention include, but are not limited to, 2,2,6,6-tetramethyl-3,5-heptanedionate (wherein $R^1=C_4$ and $R^2=C_4$), n-valerylacetone (wherein $R^1=C_1$ and $R^2=C_4$), n-hexanoylacetone (wherein $R^1=C_1$ and $R^2=C_5$), n-octanoylacetone (wherein $R^1=C_1$ and $R^2=C_7$), n-nonanoylacetone (wherein $R^1=C_1$, $R^2=C_8$), n-decanoylacetone (wherein $R^1=C_1$ and $R^2=C_{11}$), and combinations thereof.

The catalyst may also include a mixture of titanium, zirconium or hafnium diketonates and/or a mixture of a titanium, zirconium or hafnium diketonates and alkylacetoacetates. If the catalyst includes a mixture of titanium, zirconium or hafnium diketonates and/or alkylacetoacetates, then the titanium, zirconium or hafnium diketonates and/or alkylacetoacetates preferably have at least 7 carbons. However, it is also contemplated that the titanium, zirconium or hafnium diketonates and/or alkylacetoacetates may have less than 7 carbons.

The catalyst can generally be synthesized via known ligand exchange reactions of titanium, zirconium or hafnium compounds with a desired diketone (Structure I) or alkylacetoacetate (Structure II). Specifically, the catalyst may be prepared in a solution by blending titanium, zirconium or hafnium with the desired ligands as chelating agents in a solution at an ambient or slightly elevated temperature. The solution may include, but is not limited to, polyols such as propylene glycol, dipropylene glycol, 1,3-butylene glycol, 1,6-hexane diol, polypropylene glycol, polytetramethylene glycol, dimethoxy-dipropylene glycol, and combinations thereof. The solution may also include, but is not limited to, diluents including alcohols, alkyl acetates, acetone, xylene, methyl ketones, dibutylether, butoxy/propoxy/ethoxy polypropylene ethylene glycol ethers, chlorides, oxychlorides, alkoxides, carbonates, acetylacetonates of titanium, zirconium or hafnium, and combinations thereof.

The most preferred catalyst for use in the present invention is commercially available from King Industries, Inc. of Norwalk, Conn., under the trade name of K-Kat® XC-9213, and includes a zirconium chelate. Preferably the catalyst is present in the elastomeric urethane composition in an amount of from 0.5 to 1.5, more preferably in an amount of from 0.7 to 1.2, and most preferably in an amount of from 0.9 to 1.1, parts by weight of the catalyst per 100 parts by weight of the resin composition. In a preferred embodiment of the present invention, the catalyst is blended with the resin composition prior to reaction with the isocyanate. In another embodiment, the catalyst is combined with the isocyanate.

The catalyst does not require expensive disposal because the catalyst includes the metal selected from the group of titanium, zirconium and hafnium, none of which is as highly toxic as tin or mercury. The catalyst also has a high catalytic efficiency for the reaction of the polyetherol and the isocyanate. The high catalytic efficiency increases the rate of the reaction and allows the elastomeric urethane composition to be sprayed, while minimizing dripping.

Further, the catalyst has a decreased sensitivity to water and humidity present in the reaction vessel and is not deactivated when exposed to the water and humidity. Because the catalyst is not deactivated when exposed to water and humidity, less catalyst is required for use in the reaction.

Still further, the catalyst does not effectively catalyze an undesirable side reaction of water and humidity with the isocyanate. Reaction of water and humidity with the isocyanate forms gaseous carbon dioxide and foams the polyurethane elastomer, as is well known in the art. Foaming the polyurethane elastomer with the gaseous carbon dioxide is undesirable and forms voids and blisters in the polyurethane elastomer. Formation of voids and blisters results in a degradation of physical properties of the polyurethane elastomer including a weakened structural stability, a decreased density, and a non-homogeneous density. As such, there are no chemical or physical blowing agents or expanding agents present in the elastomeric urethane composition. The catalyst minimizes foaming and allows the polyurethane elastomer to be formed with consistent physical properties.

In addition to the catalyst, the elastomeric urethane composition may also include a second catalyst, different from the catalyst described above. If included, the second catalyst is most preferably present in the resin composition and may be blended with the resin composition prior to reaction with the isocyanate. However, the second catalyst may be combined with the isocyanate or may be uncombined and in the presence of the resin composition and the isocyanate. Preferably, the second catalyst includes an amine. Most preferably, the second catalyst includes triethylenediamine and 1,4 butanediol and is commercially available from Air Products and Chemicals, Inc. of Allentown, Pa., under the trade name of DABCO® S-25. If the second catalyst is included in the elastomeric urethane composition, the second catalyst is preferably included in an amount of from 0.5 to 3, and most preferably of from 1 to 2, parts by weight per 100 parts by weight of the resin composition.

The second catalyst, like the first catalyst, also reduces overall production costs. The second catalyst allows an amount of more expensive catalysts to be reduced. If the amount of the more expensive catalysts is reduced, the overall production costs will also be reduced. For example, because catalysts including amines are typically less expensive than metal catalysts, production costs can be decreased. Additionally, like the first catalyst, the second catalyst also does not include highly toxic metals that require costly disposal. As a result, the second catalyst also contributes to reducing production costs.

The elastomeric urethane composition may also include an additive or a plurality of additives that are liquids. Preferably, the additive is selected from the group of chain extenders, anti-foaming agents, processing additives, plasticizers, chain terminators, surface-active agents, adhesion promoters, flame retardants, anti-oxidants, dyes, ultraviolet light stabilizers, fillers, thixotropic agents, and combinations thereof.

Preferably, the elastomeric urethane composition includes a chain extender as an additive. Examples of preferred chain extenders include compounds having at least two functional groups with active hydrogen atoms including, but not limited to, hydrazine, primary and secondary diamines, alcohols, amino acids, hydroxy acids, glycols, and combinations thereof. Such chain extenders typically have a number average molecular weight of less than about 400 g/mol. However, chain extenders with number average molecular weights of greater than 400 g/mol are also contemplated for use. More preferably, the chain extender is selected from the group of ethylene glycol, 1,4-butanediol, 1,3-butanediol, propylene glycol, dipropylene glycol, diethylene glycol, glycerine and combinations thereof. Most preferably, the chain extender is selected from the group of 1,4-butanediol, 1,3-butanediol, and combinations thereof. 1,3-butanediol is commercially available from GE Silicones of Wilton, Conn., under the trade name of NIAX Processing Additive DP-1022.

Chain extenders typically act as cross-linking agents and improve physical characteristics of the polyurethane elastomer. While an amount of chain extender included in the elastomeric urethane composition is, in large part determined by an anticipated end use of the polyurethane elastomer, the elastomeric urethane composition preferably includes of from 1 to 20, more preferably of from 6 to about 15, and most preferably of from 8 to about 10, parts by weight of the chain extender per 100 parts by weight of the resin composition.

The elastomeric urethane composition also preferably includes an anti-foaming agent as an additive. The anti-foaming agent preferably includes a silicone liquid commercially available from Dow Corning of Midland, Mich., under the trade name of Antifoam-A. The anti-foaming agent typically acts to reduce the amount of gaseous carbon dioxide formed from the reaction of water and humidity and the isocyanate. If included in the elastomeric urethane composition, the anti-foaming agent is preferably included in an amount of from 0.01 to 0.50 and most preferably of from 0.05 to 0.15, parts by weight of the anti-foaming agent per 100 parts by weight of the resin composition.

The elastomeric urethane composition further preferably includes a chain terminator as an additive. The chain terminator preferably includes an alcohol. More preferably, the chain terminator includes a primary alcohol. Most preferably, the chain terminator includes a blend of $C_{12}$, $C_{13}$, $C_{14}$ and $C_{15}$ high purity primary alcohols commercially available from Shell Chemical LP of Houston, Tex., under the trade name of Neodol® 25. If included in the elastomeric urethane composition, the chain terminator is preferably included in an amount of from 1 to 6, more preferably of from 2 to 4, and most preferably 3, parts by weight of the chain terminator per 100 parts by weight of the resin composition.

Referring now to the article first introduced above, the article preferably includes the first layer formed from the elastomeric urethane composition. More specifically, the first layer preferably includes the polyurethane elastomer that is formed from the reaction of the resin composition and the isocyanate. The first layer preferably has a consistent surface texture and is durable, both of which contribute to the usability of the first layer.

The durability of the first layer is determined by measuring a roller fatigue resistance of the first layer with a roller fatigue test. The roller fatigue test is a variation of an ingress-egress test used to simulate repeated entry and exit from a seat body. The roller fatigue test creates a point on the first layer that is creased and repeatedly flexed under a roller. More specifically, a number of samples of the first layer are placed on a roller having a fixed weight and temperature. The samples are repeatedly creased and flexed, until cracking is visually detected. A time taken to crack the first layer, measured in hours, determines the roller rating of the first layer, and consequently, of the polyurethane elastomer. Increased roller ratings are preferred and indicate a desirable roller fatigue resistance and resilience to cracking. Preferably, the first layer has a roller fatigue resistance of greater than 50, more preferably of greater than 100, and most preferably of greater than 150, hours. The first layer of the present invention has exhibited a roller fatigue resistance of greater than 240 hours, described in greater detail below.

Depending largely on the intended use of the first layer, the thickness of the first layer is preferably of from 0.01 to 0.1, more preferably of from 0.025 to 0.075, and most preferably of from 0.040 to 0.060, mils. Further, the first layer preferably has a density of from 900 to 1110, more preferably of from 980 to 1110, and most preferably of from 1030 to 1110, $kg/M^3$. The first layer also preferably has a Shore A durometer hardness of from 50 to 100, and more preferably of from 50 to 70, as determined by ASTM D-2240. The first layer further preferably has an elongation of greater than 300% of total stretch, as determined by ASTM D412 Die A. The first layer also preferably has a tensile strength of greater than 500, more preferably of greater than 1200, and most preferably of greater than 1500, psi, as determined by ASTM D412 Die A. Also, the first layer preferably has a Graves Tear strength of greater than 60, more preferably of greater than 80, and most preferably greater than 120, pounds of force per linear inch, as determined by ASTM D624 Die C. The first layer still further preferably has a puncture resistance of greater than 100, and more preferably of greater than 200, pounds per inch, as determined using a puncture resistance test method. The puncture resistance test method is used to determine the puncture resistance of a specimen of the first layer by measuring a force required to cause a 0.1 inch diameter tip of a sharp-edged puncture probe to penetrate the specimen of the first layer. Specifically, a 0.05 inch thick specimen of the first layer is cut such that the specimen has a diameter of 1.2 inches. The specimen is fitted around an orifice of a support instrument and an edge of the specimen is crimped around the orifice to hold the specimen in place. The puncture probe is operated at a speed of 2 inches per minute and punctures the specimen of the first layer. The force required to puncture the specimen is measured. The first layer also preferably has a Taber Abrasion resistance of less than 200, and more preferably of less than 100, mg loss, as determined by ASTM D1044.

The article also preferably includes a second layer disposed on the first layer. The second layer may be disposed in contact with the first layer or may be separated from the first layer. The second layer preferably includes a urethane composition different from the elastomeric urethane composition and acts as a support layer. Most preferably, the second layer includes a foamed urethane composition that is different from the elastomeric urethane composition. The urethane composition can be modified in density, crush resistance and other important characteristics. As such, the density of the urethane composition can be controlled independently of the density of the elastomeric urethane composition and the polyurethane elastomer. Urethane compositions that are considered useful for forming the second layer include those disclosed in U.S. Pat. Nos. 4,389,454 and 5,512,319, which are hereby expressly incorporated by reference.

The article may also include additional layers. If additional layers are included in the article, the additional layers are preferably the same as the second layer, described above. However, additional layers that are different from the second layer and different from the first layer are also contemplated for use in the present invention. If additional layers are included, the additional layers may be disposed on either the first and/or the second layer, and may be disposed in contact with the first and/or the second layer or may be separated from the first and/or the second layer.

In a preferred embodiment of the present invention, the article includes the seat body, first described above. Preferably, the seat body includes the first layer formed from the elastomeric urethane composition. The seat body also preferably includes the second layer formed from the foamed urethane composition. The seat body is preferably used in non-automotive applications such as in farming, outdoor sport, and marine applications.

The present invention also provides an elastomeric urethane system that is substantially free of particulates. The elastomeric urethane system includes the resin composition, the isocyanate, and the catalyst, described above. The particulates that are minimized and preferably eliminated from the elastomeric urethane system also typically include those that are described above. Like the elastomeric urethane composition described above, the elastomeric urethane system may also include a second catalyst, one or a plurality of additives, and a second polyetherol, the same as those described above.

The present invention further provides a method for making the article in a mold having a mold cavity. Initially, the mold cavity is preferably coated with a known mold release agent by spraying to facilitate an eventual demolding of the article. However, the mold release agent may be applied to the mold cavity by other methods including pouring. If utilized, the mold release agent may include, but is not limited to, silicones, soaps, waxes, solvents, and combinations thereof.

Alternatively, or in addition to the application of the mold release agent, a coating composition having a predetermined color may be sprayed or poured into the mold cavity. The coating composition may be selected from a variety of water and solvent borne solutions. For example, the coating composition may include a one or multi-component composition including enamel or elastomeric urethane compositions, with the latter being particularly preferred. Among the numerous available coating compositions which are suitable for use in the present invention, the most preferred coating compositions for use in the present invention include Protothane®, commercially available from Titan Finishes Corporation of Detroit, Mich., Polane®, commercially available from Sherwin Williams, Inc. of Cleveland, Ohio, and Rimbond®, commercially available from Lilly Corporation of Aurora, Ill.

The method includes reacting the resin composition and the isocyanate to form the elastomeric urethane composition, wherein the resin composition and the isocyanate are reacted in the presence of the catalyst. The method also includes applying the elastomeric urethane composition, described above, to the mold cavity and allowing the elastomeric urethane composition to cure to form the first layer, also described above. To form the first layer, the polyetherol, the isocyanate, and the catalyst are preferably mixed by impingement mixing in a head of a spray gun wherein the polyetherol and the isocyanate are preferably reacted to form the polyurethane elastomer. The polyurethane elastomer is preferably applied over the mold release agent and/or coating composition if present and, in the absence thereof, directly to the surface of the mold cavity. The elastomeric urethane composition may be sprayed or poured into the mold cavity. Preferably, the elastomeric urethane composition is sprayed onto the mold. As understood by those skilled in the art, the amount of water and humidity present in the mold cavity is an important condition to be considered when making the composite structure. Preferably, the amount of water and humidity is minimized to reduce any possible foaming of the polyurethane elastomer. However, through use of the catalyst, some water and humidity may be present in the reaction vessel without adversely affecting the reaction of the polyetherol and the isocyanate or the interaction of the polyetherol or the isocyanate, with the catalyst. Typically, the elastomeric urethane composition is applied to the mold cavity in the presence of less than 100, more typically of less than 17, even more typically of less than 14, and most typically of less than 7, grains/pound absolute humidity.

The method also includes applying the urethane composition, described above, to the mold cavity to form the second layer, also described above. Preferably, the second layer serves as the support layer to the first layer. As such, the urethane composition may be applied to the first layer directly, i.e., in contact with the first layer. The second layer is preferably applied to the mold cavity after the first layer is applied to the mold cavity. However, the second layer may be applied to the mold cavity before the first layer is applied. The second layer may also be applied over the mold release agent and/or coating composition if present and, in the absence thereof, directly to the surface of the mold cavity. It is contemplated that the second layer may be sprayed or poured into the mold cavity. Most preferably, the second layer is sprayed into the mold cavity.

If the first and/or second layers are sprayed into the mold cavity, spray processing parameters may be manipulated to ensure the quality of the first and second layers. The spray processing parameters that are typically manipulated include, but are not limited to, a temperature of the elastomeric urethane composition and any additional components, a pressure of the elastomeric urethane composition entering the spray gun, a type of spray nozzle used with the spray gun, and a throughput of the spray gun. The temperature is preferably maintained between 25 and 85, and more preferably between 55 and 74° C. Similarly, if the pressure of the elastomeric urethane composition entering the spray gun is manipulated, the pressure is preferably maintained between 700 and 1500, and more preferably between 900 and 1100, psi. Also, if the throughput of the spray gun is manipulated, the throughput is preferably maintained between 5 and 50, and most preferably between 17 and 40, g/sec. Each of the aforementioned spray processing parameters may be optimized for use when the elastomeric urethane composition has a viscosities of up to 20,000, and more preferably of from 200 to 4,000, cps at 25° C.

The method also includes curing the article in the mold cavity. Preferably, the article is cured for a time of from 1 to 30, and most preferably of from 3 to 15, minutes. Also, the article is preferably cured at a temperature of from 100 to 200, more preferably of from 130 to 150, and most preferably at 140° F. The method further includes demolding the article from the mold cavity.

EXAMPLES

A series of polyurethane elastomers, (Elastomers A through D) are formed using the elastomeric urethane composition of the present invention. The Elastomers A through D are formed via hand-mixing the elastomeric urethane composition including the resin composition, the isocyanate, and the catalyst, in a 400 mL plastic beaker for 20 seconds. The resin composition includes the polyetherol, the catalyst, first and second chain extenders, the chain terminator, and the anti-foaming agent.

To form Elastomer A, a portion (Portion A) is removed from the hand-mixed elastomeric urethane composition, spread out on a tool heated to 68° C., de-molded after 5 minutes, and allowed to cure for 48 hours at room temperature. To form Elastomers B, C, and D, additional portions (Portions B through D) are removed from the elastomeric urethane composition A molecular sieve is added to Portions B and D, while fumed silica is added to Portions C and D. The molecular sieve and the fumed silica are added to absorb any water and humidity. To form Elastomers B through D, and after the molecular sieve and the fumed silica are added to the respective Portions, the Portions B through D are spread out on the tool heated to 68° C., de-molded after 5 minutes, and allowed to cure for 48 hours at room temperature. Amounts of the polyetherol, the isocyanate, the catalyst, the first and second chain extenders, the chain terminator, the anti-foaming agent, the molecular sieve, and the fumed silica that are used to form Elastomers A through D, in addition to the isocyanate index, weight ratio and % NCO of the isocyanate, are set forth in Table 1. All amounts are parts by weight based on the total weight of the resin composition, unless otherwise noted.

TABLE 1

| Component | Elastomer A | Elastomer B | Elastomer C | Elastomer D |
|---|---|---|---|---|
| Resin Composition | | | | |
| Polyetherol | 86.71 | 85.88 | 85.88 | 85.07 |
| First Chain Extender | 6.26 | 6.20 | 6.20 | 6.14 |
| Second Chain Extender | 3.37 | 3.34 | 3.34 | 3.31 |
| Chain Terminator | 2.89 | 2.86 | 2.86 | 2.84 |
| Anti-Foaming Agent | 0.10 | 0.10 | 0.10 | 0.09 |
| Molecular Sieve | 0.0 | 0.95 | 0.0 | 0.95 |
| Fumed Silica | 0.0 | 0.0 | 0.95 | 0.95 |
| Total | 100.0 | 100.0 | 100.0 | 100.06 |
| Isocyanate | | | | |
| Isocyanate, amount by weight based on 100 parts of the resin composition | 50.21 | 49.73 | 49.73 | 49.26 |
| Isocyanate Index | 102 | 102 | 102 | 102 |
| Weight Ratio | 50.21:1 | 49.73:1 | 49.73:1 | 49.26:1 |
| % NCO | 23 | 23 | 23 | 23 |
| Total | 100.0 | 100.0 | 100.0 | 100.0 |
| Catalyst | | | | |
| Catalyst | 0.67 | 0.67 | 0.67 | 0.66 |

The polyetherol, commercially available from BASF Corporation of Wyandotte, Mich., under the trade name of Pluracol® 380, is a primary hydroxyl terminated triol that includes an ethylene oxide cap of 15% by weight based on the total weight of the polyetherol, and has a number average molecular weight of 6500 g/mol, a hydroxyl number of 25 mg KOH/g, and a nominal functionality of 2.29.

The first chain extender is 1,4-butanediol.

The second chain extender is 1,3-butanediol and is commercially available from GE Silicones of Wilton, Conn., under the trade name of NIAX® Processing Additive DP-1022.

The chain terminator is a blend of $C_{12}$, $C_{13}$, $C_{14}$ and $C_{15}$ high purity primary alcohols and is commercially available from Shell Chemicals of Houston, Tex., under the trade name of Neodol® 25.

The antifoaming agent is a silicone liquid and is commercially available from Dow Corning of Midland, Mich., under the trade name of Antifoam-A.

The molecular sieve is commercially available from UPO, LLC, of Des Plaines, Ill., under the trade name of Molecular Sieve Type 3A.

The fumed silica is commercially available from Degussa AG of Düsseldorf, Germany, under the trade name of Aerosil® R972.

The isocyanate, commercially available from BASF Corporation of Wyandotte, Mich., under the trade name of Lupranate® MP-102, is a liquid modified pure diphenylmethane diisocyanate that includes a % NCO content of 23%, a nominal functionality of 2, a viscosity of 700 cps at 25° C., and a number average molecular weight of 183 g/mol.

The isocyanate index, as first introduced above, is defined as a ratio of the number of isocyanate (NCO) groups in the isocyanate to the number of hydroxyl (OH) groups in the polyetherol.

The weight ratio is the ratio of the parts by weight of the isocyanate reacted to the parts by weight of the polyetherol reacted.

The % NCO is the percent by weight of the NCO groups of the isocyanate. Determination of the % NCO content on percent by weight is accomplished by a standard chemical titration analysis known to those skilled in the art.

The catalyst, commercially available from King Industries, Inc. of Norwalk, Conn., under the trade name of K-Kat® XC-9213, includes a zirconium chelate including 2,4-pentanedionate and 6-methyl-2,4-heptanedionate as ligands chelated to the zirconium.

After the Portions A through D cure for 48 hours at room temperature and form the Elastomers A through D, samples of the Elastomers A through D are evaluated using a roller fatigue test to determine roller fatigue resistance, as first described above and as set forth in Table 2. The roller fatigue test is a variation of an ingress-egress test used to simulate repeated entry and exit from a seat body. The roller fatigue test creates a point on the first layer that is creased and repeatedly flexed under a roller. The roller is a 47.2 pound steel cylinder. More specifically, six samples of the Elastomers A through D are placed on the roller in each of four separate rows such that a total of 24 samples of the Elastomers A through D are tested. The samples are repeatedly creased and flexed as the cylinder rotated on a ball mill rolling device. The samples are creased and flexed 1600 times per hour until cracking is visually detected.

The data set forth in Table 2 includes parameters of the roller fatigue test including a roller rating that represents the number of hours the samples are creased and flexed until cracking is visually detected.

TABLE 2

|  | Elastomer A | Elastomer B | Elastomer C | Elastomer D |
| --- | --- | --- | --- | --- |
| Roller Rating (hours) | >240 | 41 | 17 | 19 |
| Number of Sample Evaluated | 5 | 6 | 6 | 6 |
| Thickness of Samples (in) | 0.04 | 0.04 | 0.04 | 0.04 |
| Number of Crease/Flex Cycles | 384,000 | 66,000 | 27,000 | 30,000 |
| Frequency of crease/flex cycles | 1600/hr | 1600/hr | 1600/hr | 1600/hr |
| Weight of roller (lbs) | 47.2 | 47.2 | 47.2 | 47.2 |
| Temperature of the roller (° F.) | 68-72 | 68-72 | 68-72 | 68-72 |
| Number of Samples Tested Simultaneously | 6 | 6 | 6 | 6 |

Roller rating is a time taken to crack the Elastomer as determined visually.

Number of crease/flex cycles is the number of times the samples are creased and flexed while being tested.

The number of samples tested simultaneously is the number of samples attached to the roller and being tested at any given time.

The results of the roller fatigue test, as set forth in Table 2, illustrate an advantage to utilizing the elastomeric urethane composition of the present invention as seen in the roller rating of greater than 240 hours exhibited by Elastomer A. Without intending to be limited by any particular theory, it is believed that the Elastomer A exhibits increased roller fatigue resistance, as compared to Elastomers B through D, because the elastomeric urethane composition used to form Elastomer A is free of particulates including the molecular sieve and the fumed silica and, as such, the homogeneity, volume, mass, and density of the elastomeric urethane composition are consistent. It is also believed that Elastomer A exhibits increased roller fatigue resistance because the first catalyst does not effectively catalyze the reaction of the isocyanate and any water present, thereby minimizing formation of gaseous carbon dioxide and allowing Elastomer A to have structural integrity and sufficient density.

Additionally, Elastomer A is also evaluated, in three trials, to determine tensile strength, elongation, Graves tear strength, puncture resistance, and Taber abrasion resistance, as set forth in Table 3. The tensile strength is determined using ASTM method D412 Die A. The elongation is determined using ASTM method D412 Die A. The Graves tear strength is determined using ASTM method D624 Die C. The puncture resistance is determined using the puncture resistance test method, first introduced above. The Taber abrasion resistance is determined using ASTM method D1044.

TABLE 3

|  | Elastomer A Trial 1 | Elastomer A Trial 2 | Elastomer A Trial 3 | Elastomer A Average |
| --- | --- | --- | --- | --- |
| Tensile Strength (psi) | 1160.3 | 1045.8 | 1204.4 | 1136.8 |
| Elongation (%) | 521.4 | 452.4 | 549 | 507.6 |
| Graves Tear Strength (pounds per linear inch) | 259.7 | 194.5 | 179.8 | 211.3 |

TABLE 3-continued

| | Elastomer A Trial 1 | Elastomer A Trial 2 | Elastomer A Trial 3 | Elastomer A Average |
|---|---|---|---|---|
| Puncture Resistance (pounds per linear inch) | 315.9 | 316.6 | 339.5 | 324 |
| Taber Abrasion Resistance (mg loss) | 112 | 120 | 105 | 112 |

The results of the determinations of tensile strength, elongation, Graves tear strength, puncture resistance, and Taber abrasion resistance indicate that the Elastomer A is suitable for use as a first layer in non-automotive seat applications. To be suitable for use as a first layer in non-automotive seat applications, the tensile strength is preferably greater than 1000 psi, the elongation is preferably of from 300 to 700, the Graves tear strength is preferably greater than 100 pli, the puncture resistance is preferably greater than 120 ppi, and the Taber abrasion resistance is preferably less than 200 mg loss. As such, Elastomer A is suitable for use as the first layer in the seat body as the preferred embodiment of the present invention. Using the elastomeric urethane composition to form the Elastomer A, and polyurethane elastomers in general, not only form polyurethane elastomers that have excellent roller fatigue resistance, but also minimize overall production costs.

Obviously, many modifications and variations of the present invention are possible in light of the above teachings. The invention may be practiced otherwise than as specifically described within the scope of the appended claims.

What is claimed is:

1. A seat body comprising:
a first layer which is an outermost layer of said seat body and which is formed from an elastomeric urethane composition that is free of blowing agents and comprises the reaction product of;
a resin composition comprising a polyetherol, wherein said polyetherol comprises an ethylene oxide cap from 5 to 20% by weight based on the total weight of said polyetherol, and wherein said polyetherol has a number average molecular weight of from 1,500 to 10,000 g/mol, a hydroxyl number of from 20 to 100 mg KOH/g, and a nominal functionality of from 2 to 4, and
an isocyanate,
wherein said resin composition and said isocyanate are reacted in the presence of a catalyst comprising a metal selected from the group of titanium, zirconium and hafnium, and
wherein said elastomeric urethane composition includes less than 1 part by weight of particulates per 100 parts by weight of said resin composition such that said elastomeric urethane composition is substantially free of particulates; and
a second layer which is a flexible support layer to said outermost layer and comprises a urethane composition that is chemically different from said elastomeric urethane composition,
wherein said urethane composition is foamed and flexible, and
wherein said urethane composition comprises the reaction product of a polyol and an isocyanate reacted in the presence of water as a blowing agent.

2. A seat body as set forth in claim 1 wherein said polyetherol comprises the reaction product of an alkylene oxide and an initiator and said initiator is selected from the group of glycerol, 1,1,1-trimethylolpropane, and combinations thereof.

3. A seat body as set forth in claim 2 wherein said alkylene oxide comprises ethylene oxide.

4. A seat body as set forth in claim 1 wherein said ethylene oxide cap is from 10 to 20% by weight based on the total weight of said polyetherol.

5. A seat body as set forth in claim 1 wherein said polyetherol has a number average molecular weight of from 3,000 to 8,000 g/mol.

6. A seat body as set forth in claim 1 wherein said polyetherol has a hydroxyl number of from 20 to 50 mg KOH/g.

7. A seat body as set forth in claim 1 wherein said polyetherol further comprises an organic functional group selected from the group of a carboxyl group, an amine group, a carbamate group, an amide group, and an epoxy group.

8. A seat body as set forth in claim 1 wherein said isocyanate comprises an aromatic isocyanate.

9. A seat body as set forth in claim 8 wherein said isocyanate is selected from the group of 2,4'-diphenylmethane diisocyanate, 4,4'-diphenylmethane diisocyanate, and combinations thereof.

10. A seat body as set forth in claim 1 wherein said isocyanate has a % NCO content of from 10 to 30% by weight.

11. A seat body as set forth in claim 1 wherein said isocyanate has a nominal functionality of from 2 to 3.

12. A seat body as set forth in claim 1 wherein said resin composition and said isocyanate are reacted at an isocyanate index of from 95 to 105.

13. A seat body as set forth in claim 1 wherein said catalyst is further defined as having the general structure:

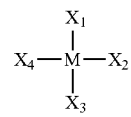

wherein M is selected from the group of titanium, zirconium and hafnium; and
wherein each of $X_1$, $X_2$, $X_3$, and $X_4$ are ligands and each are independently selected from the group of a diketone having the general structure:

$R^1COCH_2COR^2$ and
an alkylacetoacetate having the general structure:

$R^1OCOCH_2COR^2$ wherein each of $R^1$ and $R^2$ are independently selected from the group of a branched hydrocarbon and a linear hydrocarbon.

14. A seat body as set forth in claim 13 wherein each of said ligands $X_1$, $X_2$, $X_3$, and $X_4$ are 2,4-pentanedionate or 6-methyl-2,4-heptanedionate.

15. A seat body as set forth in claim 1 wherein said catalyst is present in said elastomeric urethane composition in an amount of from 0.7 to 1.2 parts by weight per 100 parts by weight of said resin composition.

16. A seat body as set forth in claim 1 wherein said catalyst is blended with said resin composition prior to reaction with said isocyanate.

17. A seat body as set forth in claim 1 further comprising a second catalyst.

18. A seat body as set forth in claim 17 wherein said second catalyst comprises an amine.

19. A seat body as set forth in claim 1 wherein said resin composition further comprises an additive that is a liquid and is selected from the group of chain extenders, anti-foaming agents, processing additives, chain terminators, surface-active agents, adhesion promoters, flame retardants, anti-oxidants, dyes, ultraviolet light stabilizers, fillers, thixotropic agents, and combinations thereof.

20. A seat body as set forth in claim 1 further comprising a second polyetherol.

21. A seat body as set forth in claim 2 wherein said initiator is selected from the group of glycerol, 1,1,1-trimethylolpropane, and combinations thereof; said alkylene oxide comprises ethylene oxide; said polyetherol comprises an ethylene oxide cap from 10 to 20% by weight based on the total weight of said polyetherol; said polyetherol has a number average molecular weight of from 3,000 to 8,000 g/mol; and said polyetherol has a hydroxyl number of from 20 to 50 mg KOH/g.

22. A seat body as set forth in claim 21 wherein said catalyst is further defined as having the general structure:

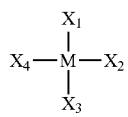

wherein M is selected from the group of titanium, zirconium and hafnium; and wherein each of $X_1$, $X_2$, $X_3$, and $X_4$ are ligands and each are 2,4-pentanedionate or 6-methyl-2,4-heptanedionate.

23. A seat body as set forth in claim 22 wherein said isocyanate is selected from the group of 2,4'-diphenylmethane diisocyanate, 4,4'-diphenylmethane diisocyanate, and combinations thereof.

24. A seat body as set forth in claim 1 wherein said elastomeric urethane composition includes less than 0.50 parts by weight of particulates per 100 parts by weight of said resin composition.

25. A seat body as set forth in claim 24 wherein said elastomeric urethane composition includes less than 0.05 parts by weight of particulates per 100 parts by weight of said resin composition.

26. A seat body as set forth in claim 25 that is further defined as a component of a vehicle in a farming, outdoor sport, or marine application.

27. A method of making a seat body in a mold having a mold cavity, said method comprising the steps of:
a) reacting a resin composition comprising a polyetherol, wherein the polyetherol comprises an ethylene oxide cap of 5 to 20% by weight based on the total weight of the polyetherol, and wherein the polyetherol has a number average molecular weight of from 1,500 to 10,000 g/mol, a hydroxyl number of from 20 to 100 mg KOH/g, and a nominal functionality of from 2 to 4, and an isocyanate to form an elastomeric urethane composition,
wherein the resin composition and the isocyanate are reacted in the presence of a catalyst comprising a metal selected from the group of titanium, zirconium and hafnium, and
wherein the elastomeric urethane composition is free of blowing agents and includes less than 1 parts by weight of particulates per 100 parts by weight of the resin composition such that the elastomeric urethane composition is substantially free of particulates;
b) applying the elastomeric urethane composition to the mold cavity and allowing the elastomeric urethane composition to cure to form a first layer which is an outermost layer of said seat body;
c) applying a urethane composition that is chemically different from the elastomeric urethane composition to the mold cavity to form a second layer which is a flexible support layer to the outermost layer, wherein the urethane composition is foamed and flexible, and wherein the urethane composition comprises the reaction product of a polyol and an isocyanate reacted in the presence of water as a blowing agent;
d) curing the seat body in the mold cavity; and
e) demolding the seat body from the mold cavity.

28. A seat body as set forth in claim 27 wherein the elastomeric urethane composition includes less than 0.50 parts by weight of particulates per 100 parts by weight of the resin composition.

29. A seat body as set forth in claim 28 wherein the elastomeric urethane composition includes less than 0.05 parts by weight of particulates per 100 parts by weight of the resin composition.

30. A seat body as set forth in claim 29 that is further defined as a component of a vehicle in a farming, outdoor sport, or marine application.

\* \* \* \* \*